(12) United States Patent
Batchelor

(10) Patent No.: US 6,378,958 B1
(45) Date of Patent: Apr. 30, 2002

(54) FLUID CONTROL VALVE AND BRAKING SYSTEM INCORPORATING SUCH A VALVE

(75) Inventor: Mark Batchelor, Newport (GB)

(73) Assignee: Meritor Heavy Vehicle Braking Systems (UK) Limited, Troy, MI (US)

( * ) Notice: Subject to any disclaimer, the term of this patent is extended or adjusted under 35 U.S.C. 154(b) by 0 days.

(21) Appl. No.: 09/646,246
(22) PCT Filed: Mar. 5, 1999
(86) PCT No.: PCT/GB99/00653
  § 371 Date: Nov. 27, 2000
  § 102(e) Date: Nov. 27, 2000
(87) PCT Pub. No.: WO99/47401
  PCT Pub. Date: Sep. 23, 1999

(30) Foreign Application Priority Data

Mar. 13, 1998 (GB) ............................................. 9805244

(51) Int. Cl.[7] ................................................ B60T 8/42
(52) U.S. Cl. ................................ 303/115.4; 303/114.1; 303/117.1; 137/112; 137/596.18
(58) Field of Search ........................... 303/113.1, 114.1, 303/114.3, 117.1, 115.4, 115.5, 116.2; 137/112, 596.18

(56) References Cited

U.S. PATENT DOCUMENTS

| | | | | |
|---|---|---|---|---|
| 4,073,543 A | | 2/1978 | Resch | 303/10 |
| 4,316,642 A | * | 2/1982 | Belart | 303/115.5 |
| 4,457,563 A | * | 7/1984 | Farr | 303/115.4 |
| 4,805,966 A | | 2/1989 | Reinartz et al. | 303/114.1 |
| 4,964,681 A | * | 10/1990 | Burgdorf et al. | 303/115.4 |
| 5,217,281 A | * | 6/1993 | Fujimoto | 303/114.1 |
| 5,577,384 A | * | 11/1996 | Watanabe et al. | 303/122.09 |
| 6,126,248 A | * | 10/2000 | Kawahata et al. | 303/114.1 |

FOREIGN PATENT DOCUMENTS

| | | |
|---|---|---|
| EP | 0465993 | 7/1991 |
| GB | WO 9947401 | 9/1999 |

* cited by examiner

Primary Examiner—Christopher P. Schwartz
Assistant Examiner—Mariano Sy
(74) Attorney, Agent, or Firm—Carlson, Gaskey & Olds

(57) ABSTRACT

A fluid flow valve having a body (11) with first, second and third fluid inlets (8, 18, 25), a working fluid outlet (4), a first pressure element (11) movable, under the influence of pilot pressure fluid applied to the first inlet, from a first position in which it causes closure of the second inlet, to a second position in which it causes opening of the second inlet, and a second pressure element (20) movable, in response to pressure at the fluid outlet, from a first position in which it causes closure of the third inlet (25) to a second position in which it causes opening of the third inlet, said elements (11, 20) operating in conjunction to permit an initial high volume fluid flow from the second inlet through the outlet and subsequently, with the second element causing interruption of a path between the second inlet and outlet, a high pressure fluid flow from the third inlet through the outlet. The invention embraces a vehicle braking system incorporating the aforesaid valve.

14 Claims, 8 Drawing Sheets

FLUID CONTROL VALVE AND BRAKING SYSTEM INCORPORATING SUCH A VALVE

This invention relates to a fluid control valve, primarily for use in a vehicle braking system, and operable, in use, to permit the application to a brake of a relatively large volume of fluid for the take-up of brake clearances and/or brake cooling, as well as to permit actuation of the brake by the supply thereto of high pressure fluid. The invention also embraces a braking system incorporating such a valve.

In some conventional braking systems, particularly for commercial or agricultural use, large slave cylinders are employed having a very significant fluid capacity, requiring, in turn, the use of correspondingly large master cylinders. Such arrangements can be disadvantageous, in terms both of the considerable space required to house them on a vehicle and also because operation of the master cylinders can require large pedal efforts or travel.

An object of the invention is to alleviate the aforesaid problems by providing a fluid control valve for use in a vehicle braking system which controls the flow of low pressure fluid to a brake from a fluid source independent of the master cylinder. A further object is to provide a braking system incorporating such a valve.

According to a first aspect of the invention, a fluid flow valve comprises a body having first, second and third fluid inlets, a working fluid outlet, a first pressure element movable, under the influence of pilot pressure fluid applied to the first inlet, from a first position in which it causes closure of the second inlet, to a second position in which it causes opening of the second inlet, and a second pressure element movable, in response to pressure at the fluid outlet, from a first position in which it causes closure of the third inlet to a second position in which it causes opening of the third inlet, said elements operating in conjunction to permit an initial high volume fluid flow from the second inlet through the outlet and subsequently, with the second element causing interruption of a path between the second inlet and outlet, a high pressure fluid flow from the third inlet through the outlet.

In one convenient arrangement, a further outlet of the body for connection to an external low pressure region is connected within the body to the working outlet when the first pressure element is in its first position and prevented from communicating with the working outlet by the first pressure element when in its second position.

Preferably, the pressure elements are pistons slidable within the body and, conveniently, telescoped one within the other.

From another aspect of the invention, a vehicle braking system comprises a fluid control valve in accordance with the aforesaid first aspect of the invention, a source of pilot pressure fluid connected to the first inlet, a fluid source capable of providing a relatively high volume supply of fluid connected to the second inlet, a high pressure fluid source connected to the third inlet and a brake connected to the working fluid outlet, the arrangement being such that pilot pressure applied via the first inlet to the first pressure element causes movement of the latter to open the second inlet for admission of a high volume fluid flow through the working fluid outlet, the second fluid pressure element being exposed to and moved by the pressure of the high volume fluid acting thereon to close the second inlet and open the third inlet through which high pressure fluid is then admitted to the brake via the working fluid outlet for brake actuation.

Conveniently, a hydrostatic master cylinder may be the source of both the pilot pressure and high pressure fluid, the high volume fluid being typically provided from a hydrodynamic fluid source.

Alternatively, a hydrodynamic fluid supply may be used, conveniently via a power valve, to provide both the high volume fluid and high pressure fluid. It would also be possible to derive the pilot pressure from the hydrodynamic supply via the power valve.

The invention will now be described, by way of example, with reference to the accompanying drawings in which.

Figure 1:
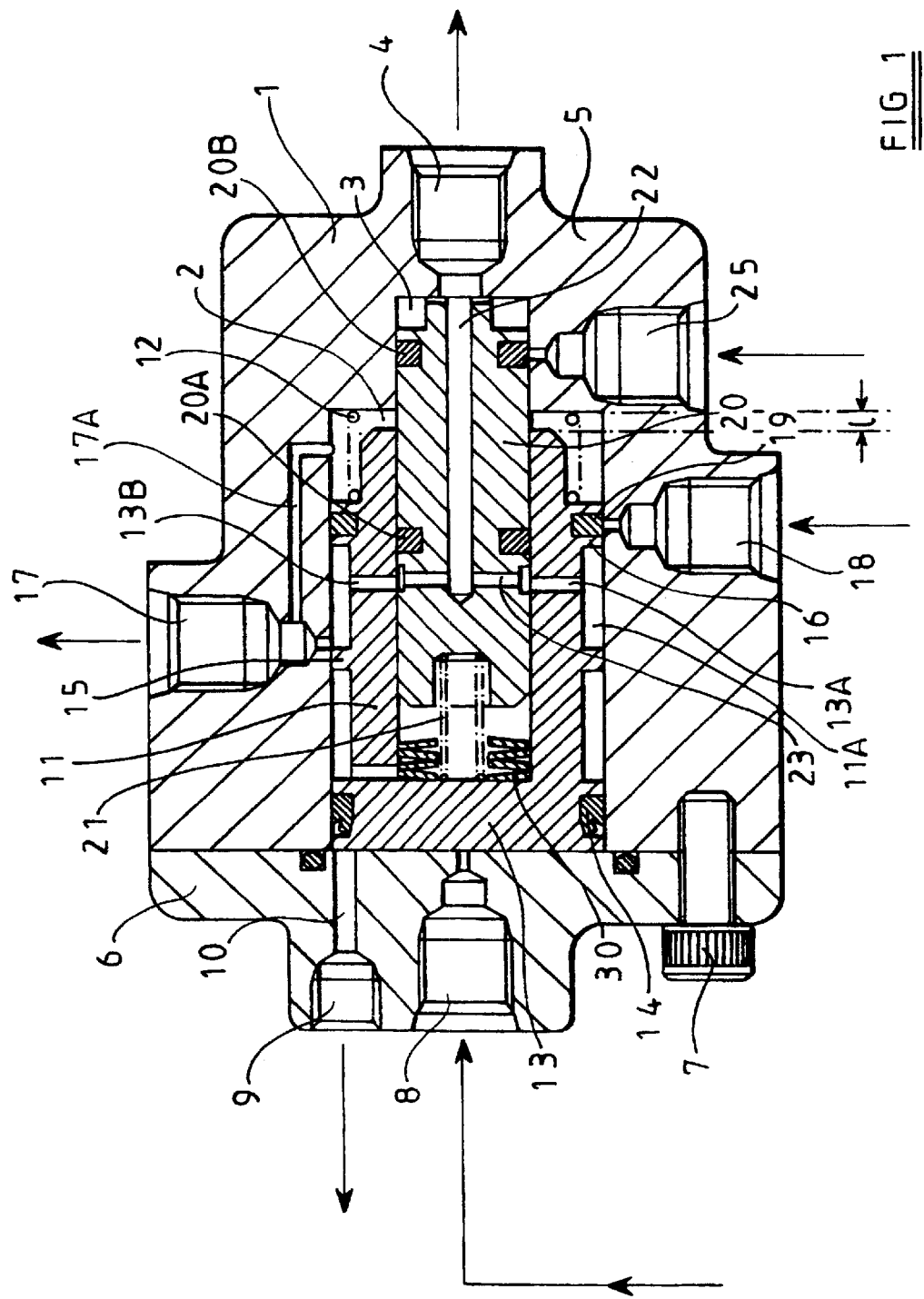
FIG. 1 is a longitudinal cross-section of one form of the fluid control valve of the invention in a non-operative or passive condition.

The fluid control valve illustrated in FIG. 1 has a body 1 formed with a co-axial stepped bore providing a larger diameter bore portion 2 and a smaller diameter bore portion 3. The bore portion 3 is blind, communicating with the exterior by way of a port 4 provided in the closed end 5 of the body. The bore portion 2 has an open end closed by a cap 6 secured to the body by fastening means illustrated as bolts 7. The cap contains a pilot pressure inlet port 8 and a bleed port 9 communicating with a bleed passage 10 through the cap.

The larger diameter bore portion 2 contains a hollow piston 11 which is urged by a spring 12 towards a leftward position in which a solid end 13 thereof abuts against the end cap 6. The end 13 is peripherally grooved to receive a pressure seal 14. The outer surface of the piston 11 is relieved to provide an annular recess 11A delimiting a pair of axially spaced lands 15, 16, which are disposed respectively adjacent a fluid return to tank port 17 and an hydraulic inlet 18. The land 16 is provided with a seal arrangement 19. A further piston 20 is slidably mounted within the hollow piston 11 and urged by a spring 21 towards a position in which it engages the solid end 5 of the body. The piston 20 is provided along a major part of its length with an axial passage 22 which forms a connection between a diametral passage 23 and the fluid outlet 4. The passage 23 is arranged to be adjacent a pair of diametrically opposed radial passages 13A, 13B through the wall of the piston 11. The piston 20 is provided with a pair of axially spaced seals 20A, 20B.

The principal operational function of the valve described above is to effect the filling of one or more large volume brake slave cylinders with low pressure hydraulic oil from a hydrodynamic hydraulic supply circuit of a vehicle, prior to the application to the cylinders of fluid under high pressure to create the necessary braking force. In use, the pilot pressure inlet port 8 is connected to a source of hydraulic pressure, which may conveniently be derived from a master cylinder of the braking system, as will be described hereafter. The hydraulic oil pressure inlet port 18 is connected to a source of hydrodynamic fluid pressure derived conveniently from an auxiliary hydraulic pump of the vehicle. The body 1 is provided with a high pressure brake fluid inlet 25 connected, in use, to a conventional pressure device such as a driver-operated master cylinder.

Figure 2:
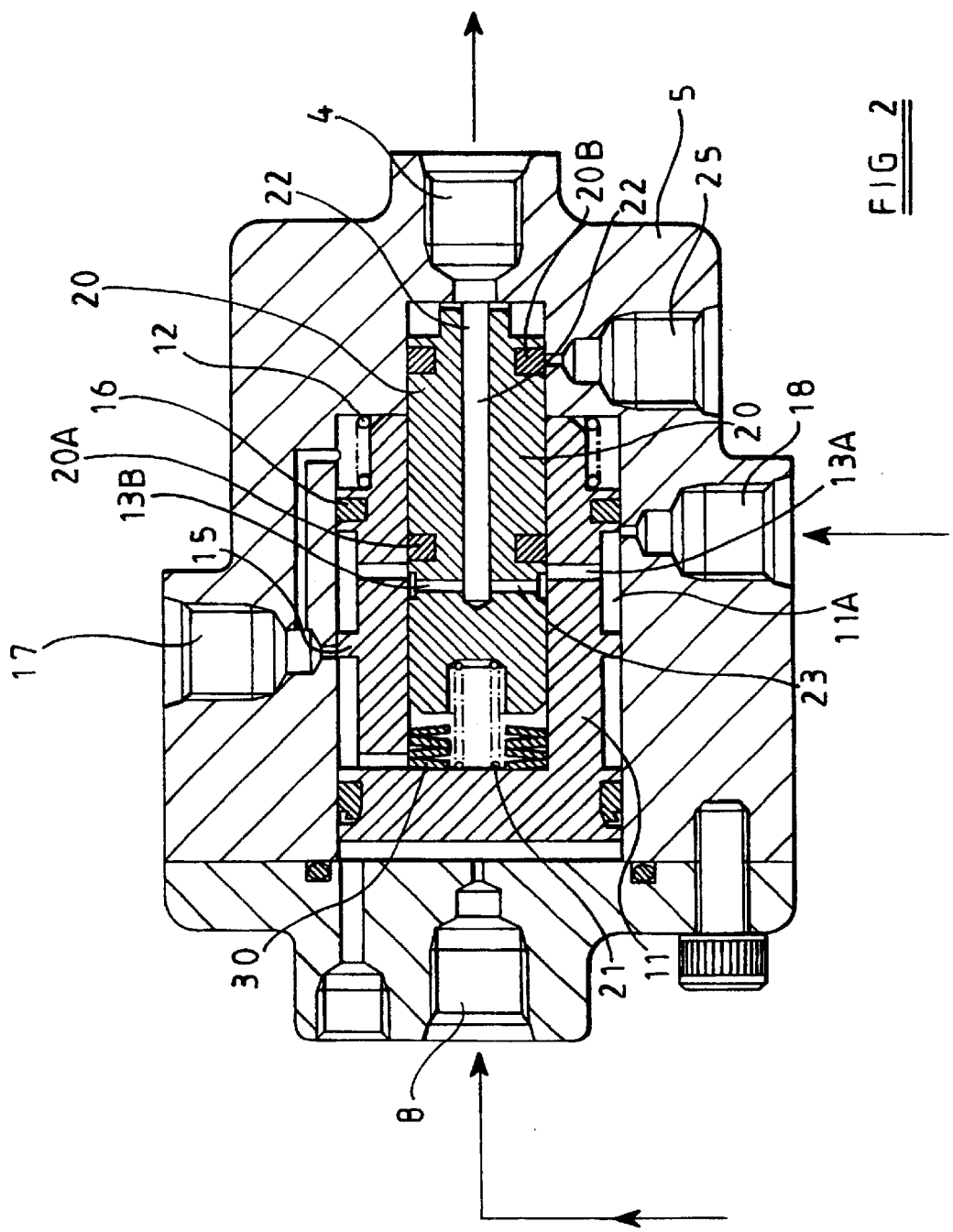
FIG. 2 is a view similar to FIG. 1 of the valve in another operative position.

A braking operation is initiated by the application of a pilot pressure via the inlet 8 to the adjacent end area of the piston 11, causing it to move through a distance 'l' relative to the piston 20 to the position shown in FIG. 2, in which it abuts the opposing end face of the solid end 5 of the body. During this movement, the spring 12 is compressed and thereby stores a return force. The space 2 beyond the forward end of the piston 11 remote from the pilot pressure inlet 8 is permanently connected by a passage 1 7A to the tank port 17 to prevent a build-up of pressure in the space 2 upon movement of the piston. The aforesaid movement of the piston 11 through distance 'l' brings the land 15 to a position in which it blocks the fluid return to tank port 17 and also moves the land 16 and its seal to at least partially uncover the hydraulic oil pressure inlet port 18, permitting oil therefrom to flow into the adjacent recess 11A in the piston 11, through the radial passage 13A of the piston 11 and thence through the diametral passage 23 and axial passage 22 of the piston 20 to the outlet 4 leading to the brake. This enables a large volume of relatively low pressure fluid from the hydrodynamic fluid source to be transmitted into the brake in order to take up brake clearances therein, prior to the brake being pressurized from the master cylinder for brake actuation. Once the brake clearances are taken up, the relatively low pressure feeding back onto the adjacent end face of the piston 20 creates sufficient force to move this piston to the left against the action of the spring 21 to the position shown in FIG. 3. Such leftward movement of the piston 20 takes place through a distance sufficient for the seal 20B to clear the hydraulic brake pressure inlet 25, simultaneously moving the seal 20A into a position to block the radial passages 13A, 13B, so as to cut off the supply of hydraulic oil from the inlet 18 to the passage 22. Leftward movement of the piston 20 also compresses a stack of Belleville washers 30 against the adjacent inner surface of the end 13 of the piston 11, such compression contributing to a progressive pedal feel experienced by the driver.

When braking pressure is released from the inlet 25 and the pilot pressure from the inlet 8, the pressure at the outlet 4 decays, enabling the spring 21 to return the piston 20 towards its initial position (FIG. 1), thereby reconnecting the passage 22 via the passages 23, 13A, 13B to the return outlet 17, permitting fluid to be discharged, as required, upon release of the brake.

Figure 3:
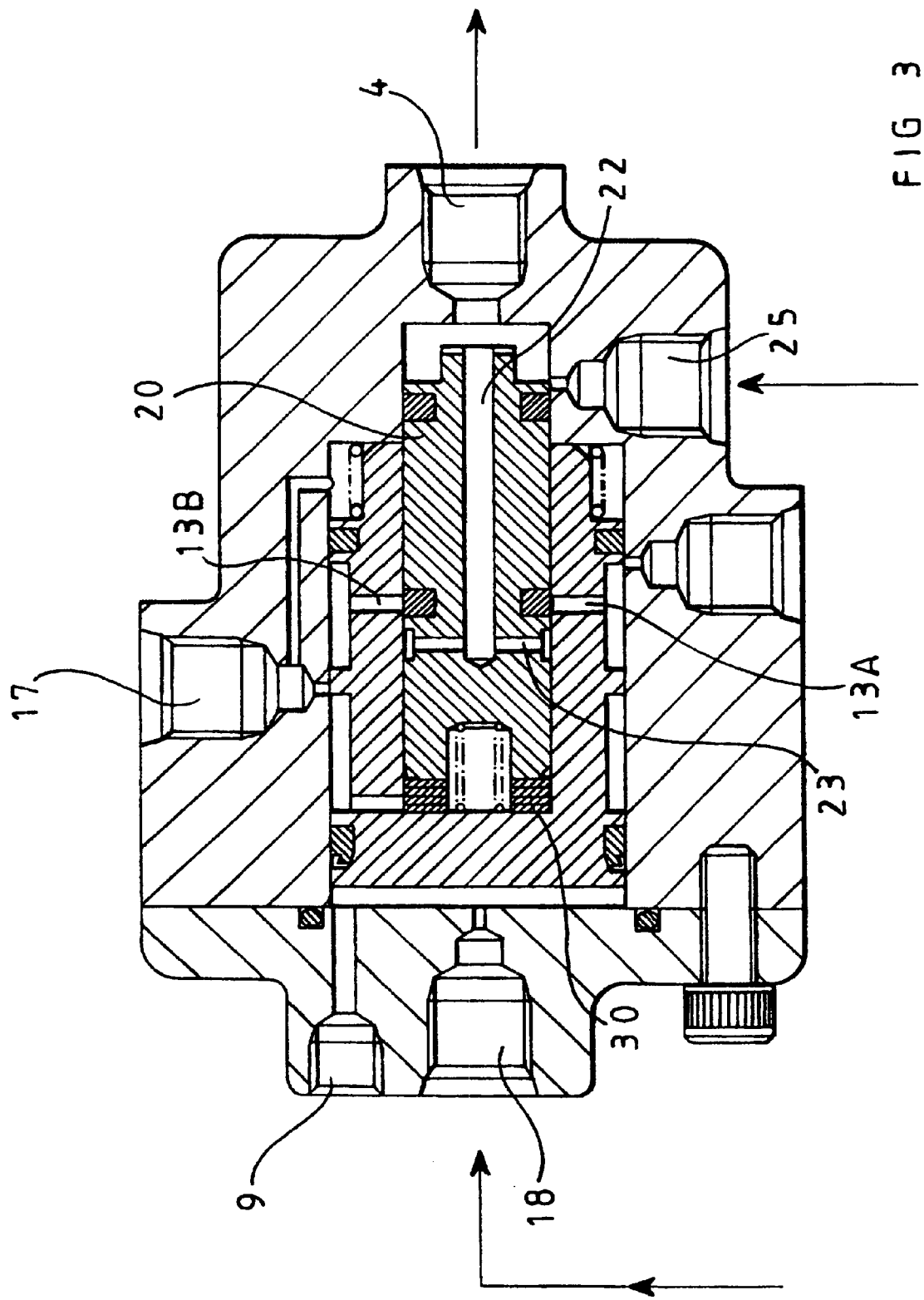
FIG. 3 is a view similar to FIGS. 1 and 2 of the valve in a further operative position.
Figure 4:
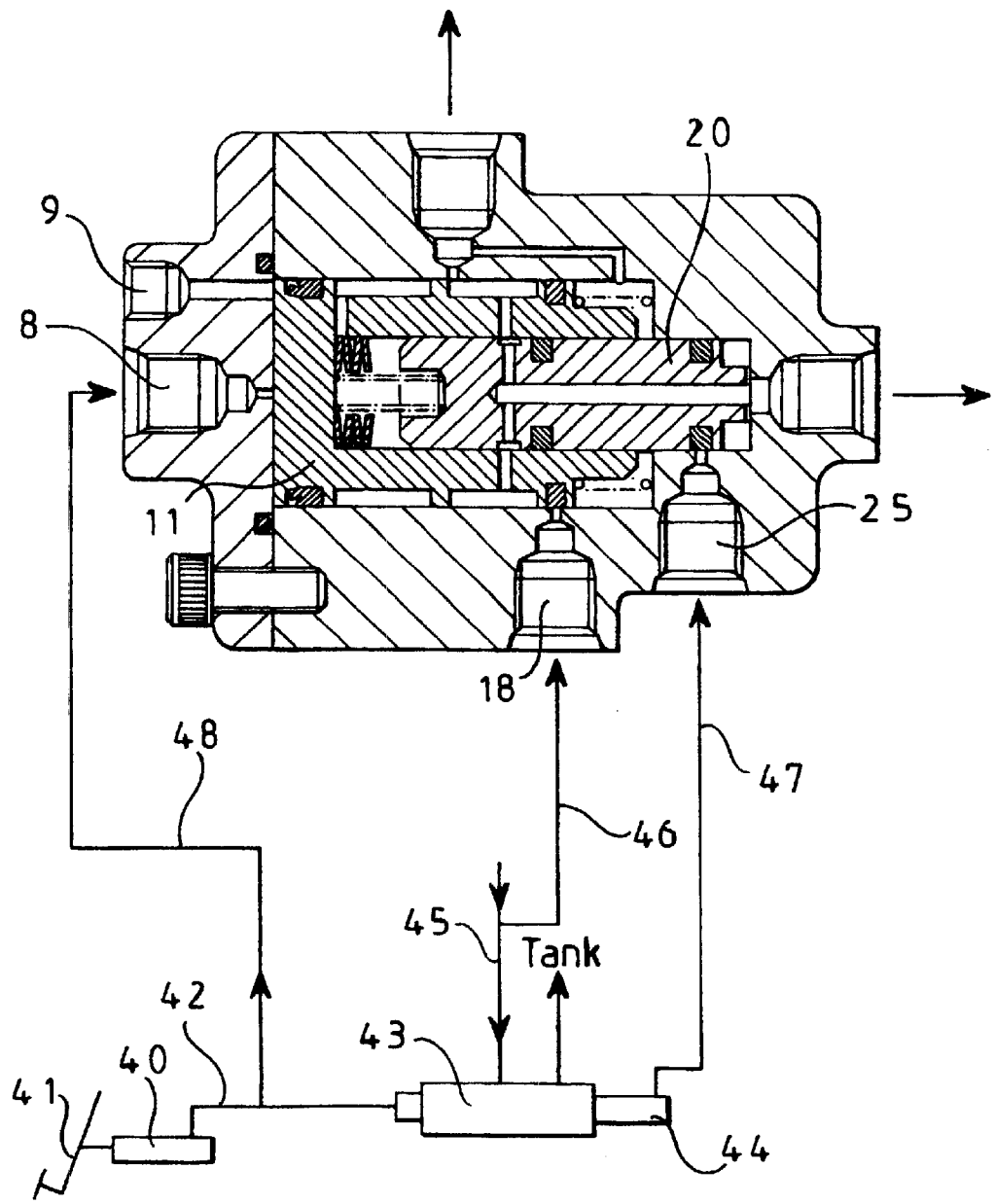
FIG. 4 illustrates the valve of FIG. 1 incorporated in a braking system which is depicted schematically.

FIG. 4 illustrates schematically a braking system incorporating the valve of FIGS. 1 to 3. The system includes a master cylinder 40 operable by a brake pedal 41, the master cylinder being connected by a line 42 to a remote booster 43 via which is operated a brake actuating master cylinder 44. A branch line 48 from the line 42 is connected to the pilot pressure inlet 8 of the valve. The booster 43 is actuated by a hydrodynamic fluid supply via line 45, from which a branch 46 is connected to the low pressure fluid inlet 18. The output from the master cylinder 44 is supplied via line 47 to the brake pressure fluid inlet 25. Initial pressure on the brake pedal 41 causes a pilot pressure to be applied at the inlet 8, which moves the piston 11 of the valve to the position illustrated in FIG. 2 allowing the brake to be rapidly filled, via the inlet 18, with a large volume of fluid for brake clearance take-up. This action is followed by leftward movement of the piston 20, as previously described, to close off the inlet 18 and open inlet 25, permitting high pressure fluid to be supplied from the master cylinder 44 along line 47 into inlet 25 for brake actuation. Release of the brake pedal and consequent decay of braking pressure permits the pistons to re-assume their illustrated rest positions.

Figure 5:
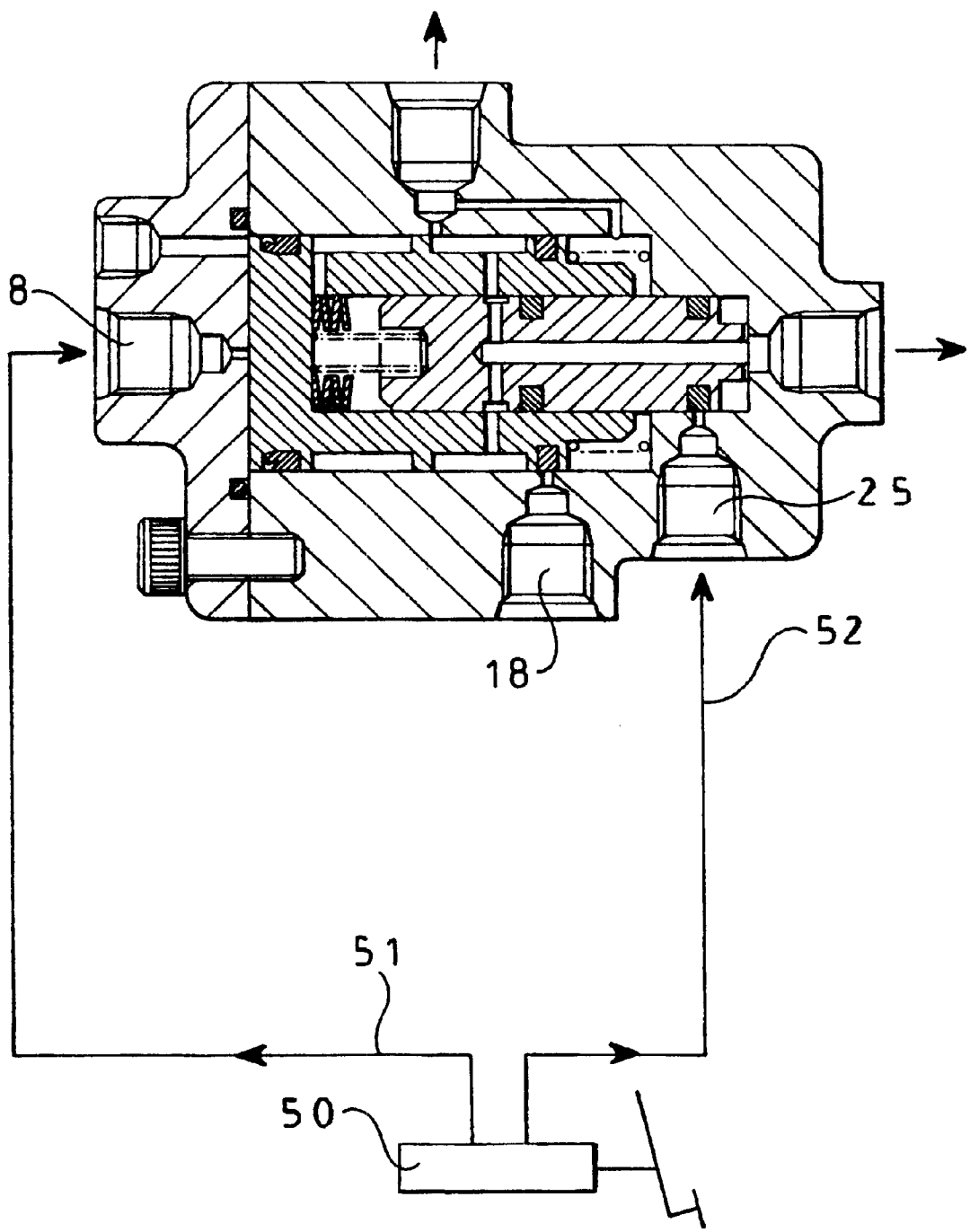
FIG. 5 illustrates the valve of FIG. 1 incorporated into an alternative braking system depicted schematically.

In the system illustrated in FIG. 5, a tandem master cylinder 50 is used, enabling a pilot pressure to be generated in one part of the master cylinder and transmitted via a line 51 to the pilot pressure inlet 8. The brake actuating pressure is generated in the other part of the master cylinder and transmitted via a line 52 to the brake pressure inlet 25. The low pressure high volume fluid is applied to the inlet 18 from an auxiliary pumped hydrodynamic supply of the vehicle, as before. Operation of the valve is identical to that described previously.

Figure 6:
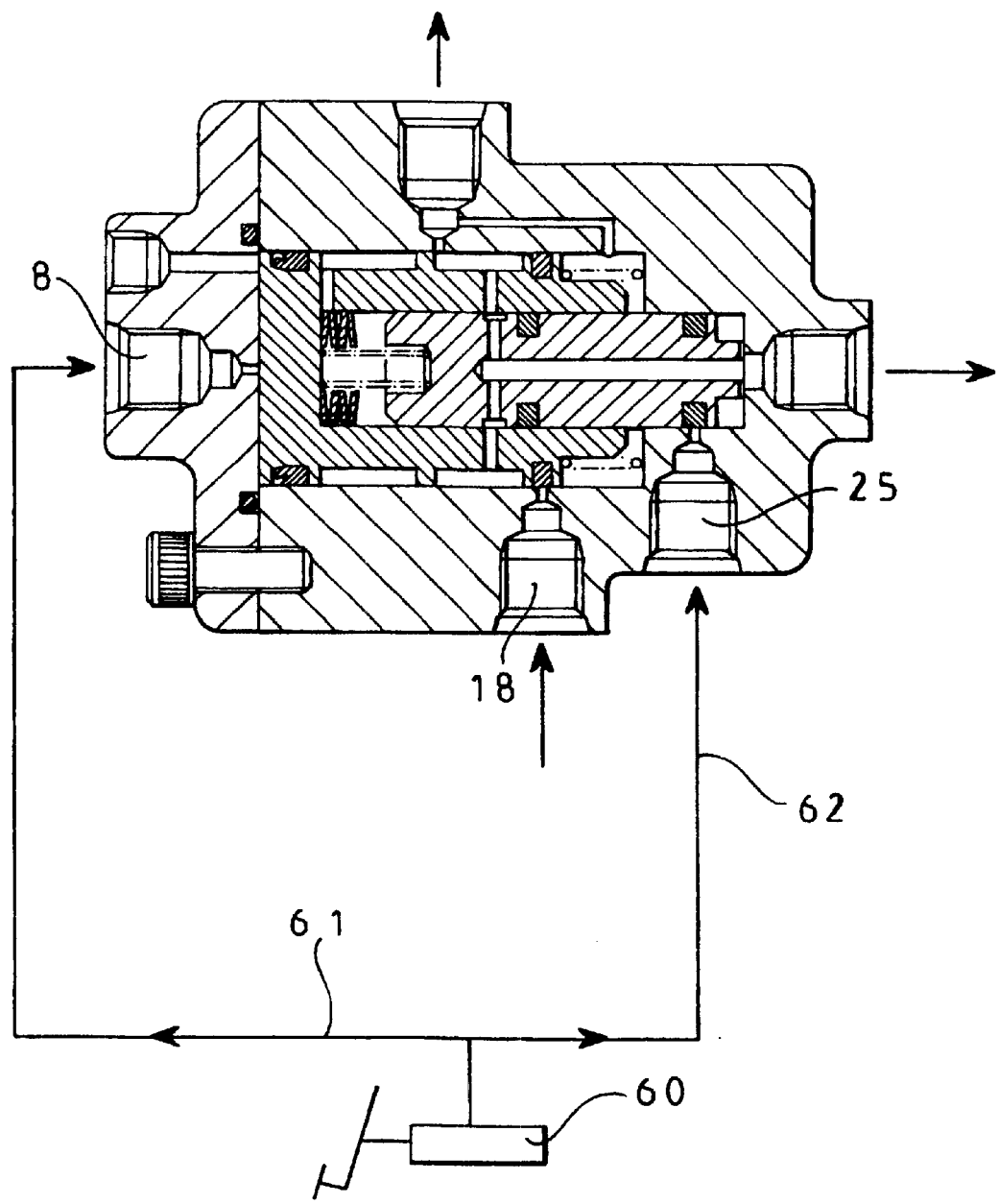
FIG. 6 illustrates the valve of FIG. 1 incorporated in a further alternative braking system, depicted schematically.

In the system described in FIG. 6, a single master cylinder 60 is used to provide both the pilot pressure and brake actuating pressure. The master cylinder output is connected via line 61 to the pilot pressure inlet 8 and via line 62 to the actuating pressure inlet 25. As in. the previous embodiment, the high volume supply is provided at inlet 18 from a pumped auxiliary system of the vehicle. Actuation of the brake pedal will cause the valve initially to supply the brake rapidly with low pressure fluid and subsequently with fluid at brake actuating pressure, as described above.

Figure 7:
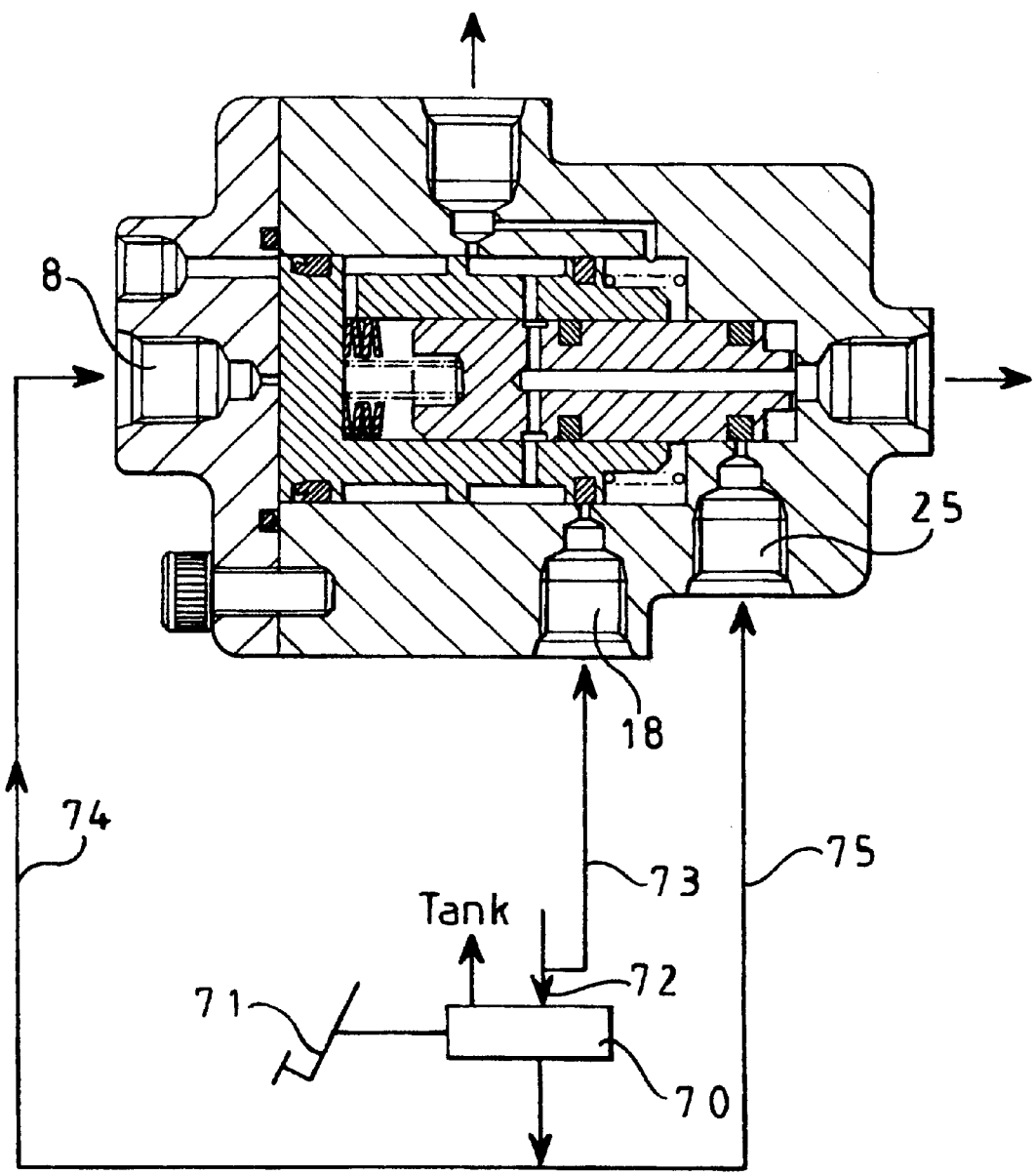
FIG. 7 illustrates the valve of FIG. 1 incorporated into a further alternative braking system depicted schematically.

A further alternative system of the invention is illustrated in FIG. 7 and employs a power valve 70 actuated by a driver-operated pedal 71. The power valve receives oil from a hydrodynamic source, such as a pump-operated system of a vehicle, through line 72, from which a branch 73 applies the fluid to the inlet 18. Fluid leaving the valve 70 is directed along a branch 74 to the pilot inlet 8 and along a branch 75 to the actuating pressure inlet 25. In this case, it will be seen that the pilot pressure and brake actuating pressure are both taken from the power valve 70. Operation of the valve is as described previously.

Figure 8:
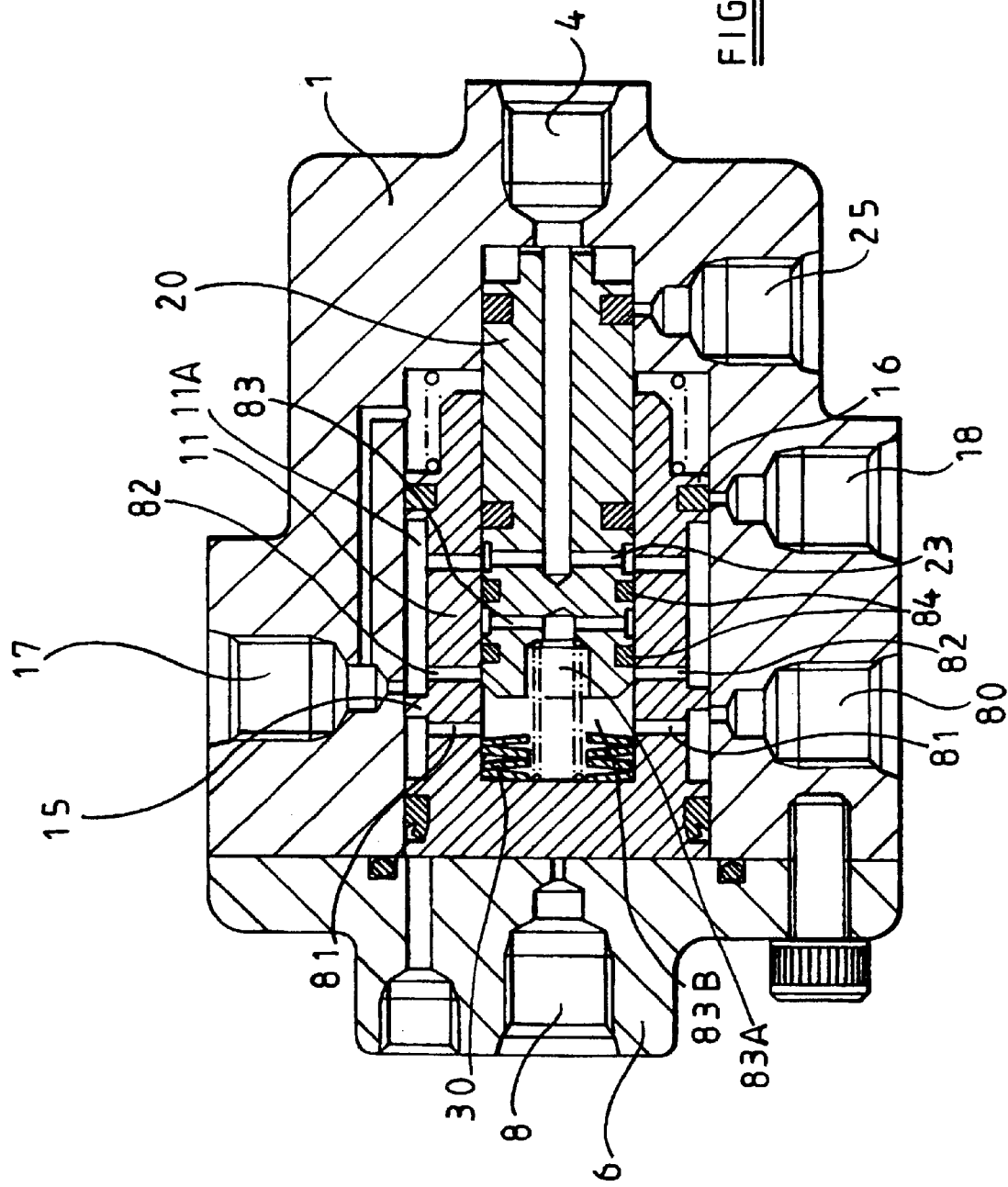
FIG. 8 illustrates the valve of the invention in a form permitting the supply of cooling fluid to a brake.

The valve illustrated in FIG. 8 is generally similar to that of FIGS. 1 to 7, but modified to enable a supply of cooling fluid to be applied to a brake, in addition to providing the other functions described above. The major components of the valve are the same as those described previously, notably comprising the body 1 closed by an end cap 6 and containing the larger and smaller diameter mutually telescoped pistons 11 and 20, the body having inlets 8, 18 and 25 and outlets 4 and 17 arranged generally as previously described. The body now has an additional outlet 80 for cooling fluid opening into the body at the left-hand side of the land 15 and the piston 11 has axially spaced pairs 81, 82 of aligned through radial passages in its cylindrical wall, the passages of each pair being arranged respectively at either side of the land 15. The small diameter piston 20 is provided with a further radial passage 83 in addition to the existing passage 23, the passage 83 communicating via an axial hole 83A with a chamber 83B containing the Belleville washers 30. Additional seals 84 are provided respectively at either side of the passage 83.

In operation, pilot pressure applied to the inlet 18 causes successive movement of the pistons 11 and 20 to effect brake filling and pressure braking operations, as described previously. At this stage, the inlet port 18 is uncovered, allowing low pressure oil into the annular recess 11A between the lands 15, 16. As the inner piston moves away from the outlet 4, the left hand one of the additional seals 84 moves to the opposite side of the passage 82, establishing communication between the inlet port 18 and outlet port 80 via passages 82, 83, hole 83A, chamber 83B and passages 81. A relatively large volume of low pressure fluid is thus supplied to the brake via outlet port 80 during brake actuation and can serve, for example, for brake cooling. Removal of the pilot pressure from the inlet 18 causes the valve to return to the illustrated initial position.

It will be understood that the valve may be arranged differently from that in the embodiments described. For example, it is not necessary for the pistons to be telescoped one within the other, although this is desirable for space-saving and simplicity. It is possible for at least the pilot pressure input to be pneumatic rather than hydraulic.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A fluid flow valve comprising a body having first, second and third fluid inlets, a working fluid outlet, a first pressure element movable, under the influence of pilot pressure fluid applied to the first inlet, from a first position in which it causes closure of the second inlet, to a second position in which it causes opening of the second inlet, and a second pressure element movable, in response to pressure at the fluid outlet, from a first position in which it causes closure of the third inlet to a second position in which it causes opening of the third inlet, said elements operating in conjunction to permit an initial high volume fluid flow from the second inlet through the outlet and subsequently, with the second element causing interruption of a path between the second inlet and outlet, a high pressure fluid flow from the third inlet through the outlet.

2. A valve according to claim 1, wherein a further outlet of the body for connection to an external low pressure region is connected within the body to the working outlet when the first pressure element is in its respective first position and prevented from communicating with the working outlet by the first pressure element when in its second position.

3. A valve according to claim 1, wherein the pressure elements are pistons slidable within the body.

4. A valve according to claim 3, wherein the pistons are telescoped one within the other.

5. A valve according to claim 1, wherein the first and second elements are spring-urged in opposite directions towards abutment against respective oppositely facing surfaces of the body.

6. A valve according to claim 1, wherein the first pressure element in its second position opens a path extending through both pressure elements between the second inlet and the outlet, and the second pressure element in its second position opens a direct path between the third inlet and the outlet, whilst closing said path between the second inlet and the outlet.

7. A valve according to claim 1, wherein the first and second pressure elements cooperate to provide a low pressure fluid flow from the body during high pressure brake actuator flow through said outlet.

8. A valve according to claim 7, wherein movement of the second pressure element to its second position opens a passage in the first pressure element such as to place the second inlet in communication with a port through which said low pressure fluid flow takes place during high pressure brake actuating flow through said outlet.

9. A vehicle braking system comprising a fluid control valve in accordance with any one of the preceding claims, a source of pilot pressure fluid connected to the first inlet, a fluid source capable of providing a relatively high volume supply of fluid connected to the second inlet, a high pressure fluid source connected to the third inlet and a brake connected to the working fluid outlet, the arrangement being such that pilot pressure applied via the first inlet to the first pressure element causes movement of the latter to open the second inlet for admission of a high volume fluid flow through the working fluid outlet, the second fluid pressure element being exposed to and moved by the pressure of the high volume fluid acting thereon to close the second inlet and open the third inlet through which high pressure fluid is then admitted to the brake via the working fluid outlet for brake actuation.

10. A system according to claim 9, wherein a hydrostatic master cylinder serves as the source of both the pilot pressure and high pressure fluid.

11. A system according to claim 10, wherein the master cylinder is connected to a booster which operates a brake actuating master cylinder from which high pressure fluid is applied to the third valve inlet.

12. A system according to claim 10, wherein the high volume fluid flow is provided from a hydrodynamic fluid source.

13. A system according to claim 10, wherein the hydrostatic master cylinder is a tandem master cylinder, one cylinder part of which generates the pilot pressure and the other cylinder part of which generates the brake actuating pressure.

14. A system according to claim 9, wherein a power valve receives fluid from a hydrodynamic source which also serves as the source of the low pressure fluid, said power valve providing both the pilot and brake actuating pressures.

* * * * *